United States Patent

Zutz

[11] Patent Number: 5,673,921
[45] Date of Patent: Oct. 7, 1997

[54] SLIDE RING AND/OR COUNTERRING MADE OF TWO MATERIALS

[75] Inventor: Hans-Henning Zutz, Wermelskirchen, Germany

[73] Assignee: AE Goetze GmbH, Burscheid, Germany

[21] Appl. No.: 614,154

[22] Filed: Mar. 12, 1996

[51] Int. Cl.⁶ ............................................. F16J 15/34
[52] U.S. Cl. ................... 277/84; 277/85; 277/92; 175/371; 175/372
[58] Field of Search ................... 277/92, 84, 85; 175/371, 372

[56] References Cited

U.S. PATENT DOCUMENTS 4,640,559 2/1987 Crotti ............................ 277/92

FOREIGN PATENT DOCUMENTS

| 942289 | 2/1974 | Canada ............................ 277/92 |
| 2 549 565 | 1/1985 | France . |
| 1675055 | 11/1970 | Germany ............................ 277/92 |
| 79 25 908 | 6/1980 | Germany . |
| 79 24 588 | 10/1980 | Germany . |
| 10116 | 1/1980 | Japan ............................ 277/92 |
| 2093172 | 4/1990 | Japan . |
| 857605 | 8/1981 | U.S.S.R. ............................ 277/92 |
| 2 070 702 | 9/1981 | United Kingdom . |
| 2 143 911 | 2/1985 | United Kingdom . |

*Primary Examiner*—William A. Cuchlinski, Jr.
*Assistant Examiner*—Christina Annick
*Attorney, Agent, or Firm*—Spencer & Frank

[57] ABSTRACT

A slide ring unit includes a slide ring having first and second opposite axial ends. The slide ring further has a sealing face at the first axial end and a conical circumferential surface for supporting an elastic rolling body thereon. The circumferential surface tapers from the sealing face toward the second axial end. The slide ring unit further has a stop for axially retaining the rolling body on the circumferential surface of the slide ring. The stop forms a component separate from the slide ring and adjoins the slide ring at the second axial end thereof. The stop has an outer circumferential surface terminating at and flush with the conical circumferential surface of the slide ring at the second axial end thereof. Further, a securing arrangement is provided for attaching the stop to the slide ring.

6 Claims, 2 Drawing Sheets

SLIDE RING AND/OR COUNTERRING MADE OF TWO MATERIALS

BACKGROUND OF THE INVENTION

The invention relates to a slide ring and/or counterring (hereafter collectively referred to as slide ring) of a slide ring seal assembly, particularly of a running gear seal assembly. The slide ring has at least one conical circumferential surface designed to receive an elastic rolling body and a stop comprised of a separate body being disposed at the axial end of the circumferential surface facing away from the sealing face to axially hold the rolling body.

Oil-lubricated and grease-lubricated bearing arrangements are permanently protected against contaminated liquids and abrasive materials by highly wear-resistant slide ring seal assemblies made from chill casting, hardened forging grade steels or from drawn and hardened sheet metal pieces. Usually, these slide ring seal assemblies are comprised of two geometrically identical slide rings. The required axial pressing force applied to the sealing face is generated by compressing correspondingly formed elastomer parts. In the axial end region, the slide rings are provided with a stop in order to ensure that the elastomer parts are held on the slide rings during transport and storage and that an insertion effect is accomplished during assembly and, as a consequence, a perpendicular position with respect to the center axis becomes possible. The stops can be made in different ways such as, for example, by way of metal removal such as turning, grinding, or by forging or upsetting. In cast slide ring seal assemblies, the stops may be cast integrally with the seal.

In practice, a slide ring manufactured as outlined above is very expensive. Consequently, stops have already been made as separate bodies which were subsequently connected with the slide ring. German utility model 79 24 588 discloses a slide ring having a separate stop. It was found, however, that arranging a stop on the conical circumferential surface was impractical, particularly because of the relatively wide tolerance ranges for castings. In order to ensure that the stop can be connected with the slide ring in a sufficiently tight manner, the seat surface of the stop must be additionally treated by metal-removing methods. Furthermore, in the transition region between stop and circumferential surface edges may appear which can damage the rolling bodies.

SUMMARY OF THE INVENTION

It is an object of the invention to provide an improved slide ring of the above-outlined type to allow a cost-advantageous manufacture of stops which, in addition, is independent of casting tolerances.

This object and others to become apparent as the specification progresses, are accomplished by the invention, according to which, briefly stated, the slide ring unit includes a slide ring having first and second opposite axial ends. The slide ring further has a sealing face at the first axial end and a conical circumferential surface for supporting an elastic rolling body thereon. The circumferential surface tapers from the sealing face toward the second axial end. The slide ring unit further has a stop for axially retaining the rolling body on the circumferential surface of the slide ring. The stop forms a component separate from the slide ring and adjoins the slide ring at the second axial end thereof. The stop has an outer circumferential surface terminating at and flush with the conical circumferential surface of the slide ring at the second axial end thereof. Further, a securing arrangement is provided for attaching the stop to the slide ring.

As a result of the arrangement according to the invention, no harmful edges can develop in the transition region. The outside circumferential surface should preferably be curved in a convex manner. According to a further feature of the invention, the stop is provided with an axially oriented leg which may be configured as a cylindrical sleeve and which may be inserted axially into the slide ring. With these measures it is possible to connect to the stop a slide ring which is produced by a sand casting method and which has a large tolerance zone, without the need for metal removing treatment of the inside circumferential surface. The stop is simply pressed into the slide ring and, according to a further feature of the invention, is connected in a form-fitting manner with the slide ring. For this purpose, an undercut may be arranged in the end region of the cylindrical sleeve. A different connection, such as a press fit (frictional engagement) is also conceivable. If the slide ring has a large diameter, it is advantageous to configure the stop as a segment-shaped profiled body. The individual segments may be arranged in dovetailed grooves provided in the axial end region of the circumferential surface. The stop is preferably formed of plastic material. Because of its special flow characteristic, a plastic material embeds itself into the surface structure of the casting in the presence of a corresponding pressure load and surface configuration of the two pieces to be joined, thus providing sufficient adhesive strength. Alternatively, it is possible to inject the plastic material into the predetermined recesses of the slide ring. This production method is largely independent of the tolerances of the cast body. Since, during injection, adhesive forces from dimensional overlap are not generated, it is possible that the parts separate from each other under certain circumstances. Particularly for this situation, it is of advantage to use a plastic material on the basis of polyvinyl acetate or polyvinyl alcohol. These materials dissolve without damaging residues at corresponding temperatures or upon contact with the media against which sealing takes place. Since the stop is only needed for the time period until the assembly of the slide rings is complete, its disappearance does not impair the functional reliability of the system.

DESCRIPTION OF THE PREFERRED EMBODIMENTS

Figure 1:
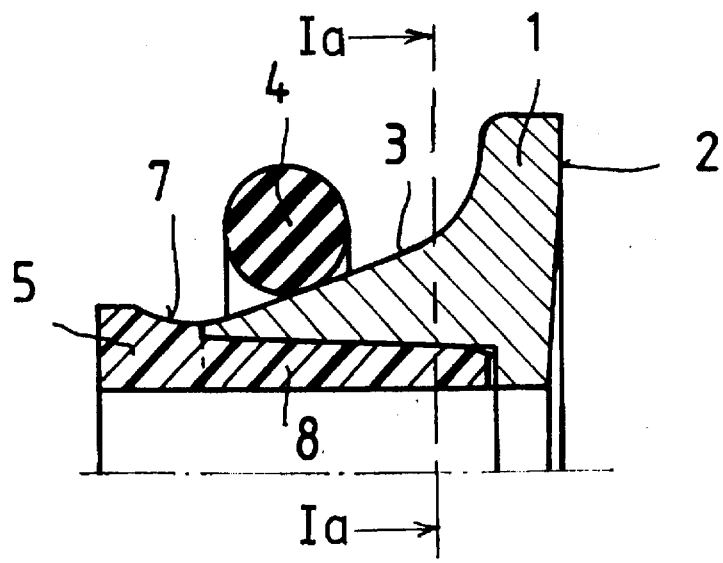
FIG. 1 is an axial sectional view of a first preferred embodiment according to the invention.
Figure 2:
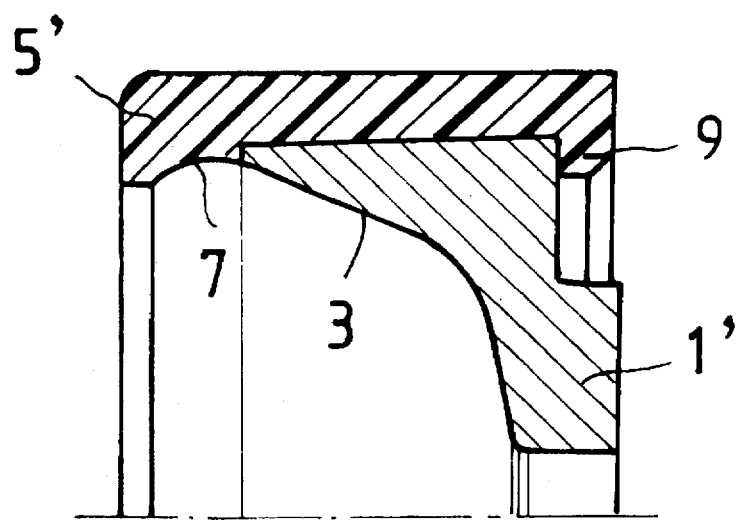
FIG. 2 is an axial sectional view of a second preferred embodiment according to the invention.
Figure 3:
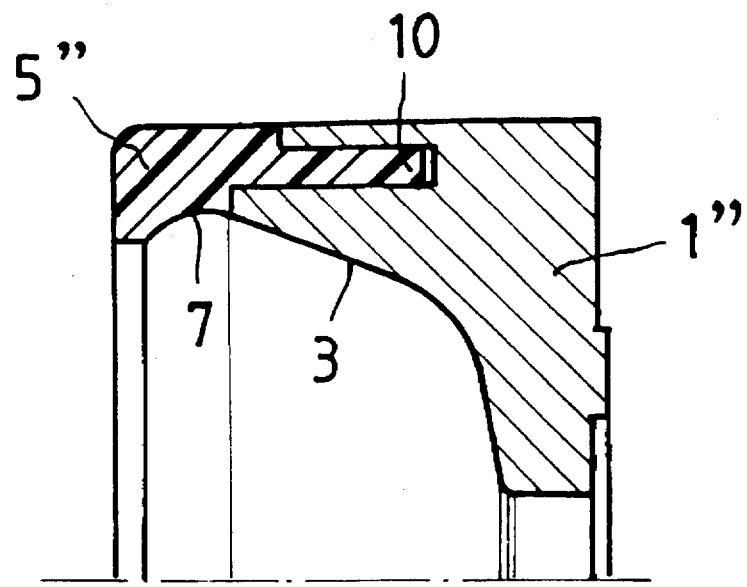
FIG. 3 is an axial sectional view of a third preferred embodiment according to the invention.

FIGS. 1, 2 and 3 show slide rings or counterrings of a running gear seal assembly which is not shown in detail. Since slide rings and counterrings may have identical geometrical contours, the description which follows only addresses a slide ring.

The slide ring 1 shown in FIG. 1 has a conical circumferential surface 3 at its side facing away from the sealing face 2 for receiving an elastic rolling body 4. The slide ring 1 is a cast component made of a high-grade, wear-resistant material. At the end region of the circumferential surface 3, a stop 5 is disposed having a concave outer circumferential surface 7. According to the invention, the stop 5 is arranged such that the surface 7 terminates without edges at the end of the conical circumferential surface 3 and thus, as it is well seen in FIG. 1, the surface 7 forms a smooth, curved continuation of surface 3.

Figure 1A:
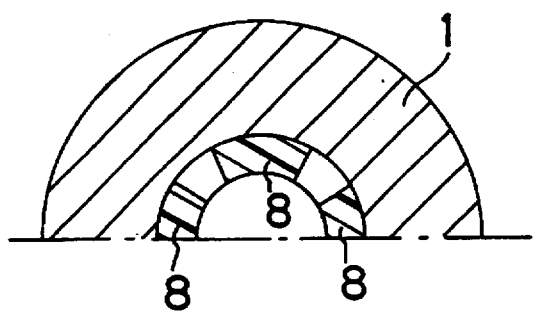
FIG. 1a is a sectional view taken along section Ia—Ia of FIG. 1.
Figure 1B:
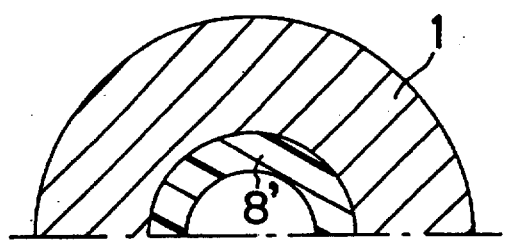
FIG. 1b is a view similar to FIG. 1a, illustrating a variant.

As shown in FIGS. 1 and 1a, the stop 5 has several axially oriented and circumferentially arranged legs 8 which are held at the inner circumferential surface of the slide ring 1. Instead of a plurality of legs 8, a single member in the form of a cylindrical holding sleeve 8' may be used, as shown in FIG. 1b. Preferably, the stop 5 is made of a plastic material. The outside diameter of the sleeve 8' is slightly larger than the upper tolerance dimension of the inside diameter of the slide ring 1. This type of fastening has the advantage that the slide ring 1 formed of a high-strength material does not need any further treatment after the casting process in order to ensure a tight connection between stop 5 and slide ring 1. Because of its special flow characteristics, the plastic material embeds itself at a corresponding specific pressure load into the surface structure of the casting.

Alternatively, as shown in FIG. 2, the stop 5' is a sleeve-like body which surrounds the slide ring 1' and which has a radially inwardly extending shoulder 9 in order to form an additional clamping arrangement with the slide ring 1'.

According to the embodiment shown in FIG. 3, for larger slide ring diameters, for example, in excess of 250 mm, the stop 5" may be configured as segment-shaped profiled bodies and they may extend in recesses 10 of the slide ring 1". It is of no consequence for the invention whether the stop is arranged internally (FIG. 1) or externally (FIGS. 2 and 3) of the slide ring.

It will be understood that the above description of the present invention is susceptible to various modifications, changes and adaptations, and the same are intended to be comprehended within the meaning and range of equivalents of the appended claims.

I claim:
1. A slide ring unit comprising
 (a) a slide ring being of a first material and having first and second opposite axial ends and including
  (1) a sealing face at said first axial end; and
  (2) a conical circumferential surface for supporting an elastic rolling body thereon; said surface tapering from said sealing face toward said second axial end;
 (b) a stop for axially retaining the rolling body on said surface; said stop forming a component separate from said slide ring and adjoining said slide ring at said second axial end thereof; said stop having a concave outer circumferential surface terminating at and being flush with said conical circumferential surface at said second axial end of said slide ring whereby said concave outer circumferential surface forms a smooth, curved continuation of said conical circumferential surface; said stop being of a second material different from said first material; said second material being a plastic; and
 (c) securing means for attaching said stop to said slide ring.
2. The slide ring unit as defined in claim 1, wherein said securing means comprises an axially oriented leg structure forming part of said stop; said leg structure being in engagement with said slide ring.
3. The slide ring unit as defined in claim 2, wherein said leg structure extends into said slide ring and engages an inner circumferential face thereof.
4. The slide ring unit as defined in claim 2, wherein said leg structure extends into said slide ring and frictionally engages an inner circumferential face thereof.
5. The slide ring unit as defined in claim 2, wherein said leg structure comprises a plurality of axially oriented legs.
6. The slide ring unit as defined in claim 1, wherein said plastic is based on a material selected from the group consisting of polyvinyl acetate and polyvinyl alcohol.

* * * * *